March 24, 1959  W. J. SCHMIDT ET AL  2,879,479
MAGNETIC DAMPING ASSEMBLY
Filed Nov. 18, 1955  2 Sheets-Sheet 1

WITNESSES
Robert C. Baird
David W. Schiller

INVENTORS
Warren J. Schmidt &
Walter Axman.
BY C. L. Friedman
ATTORNEY

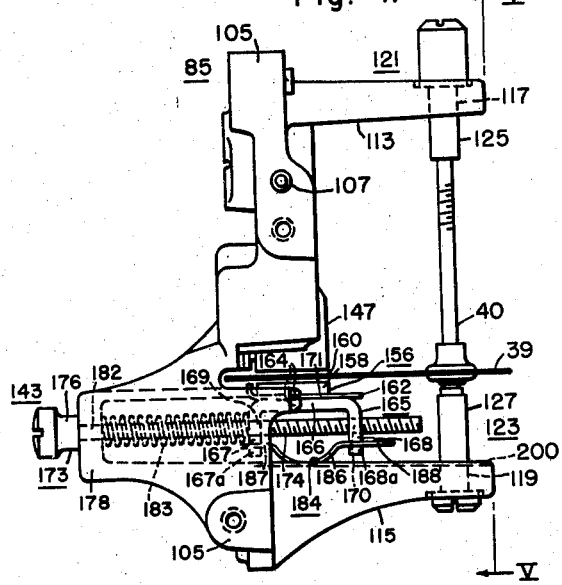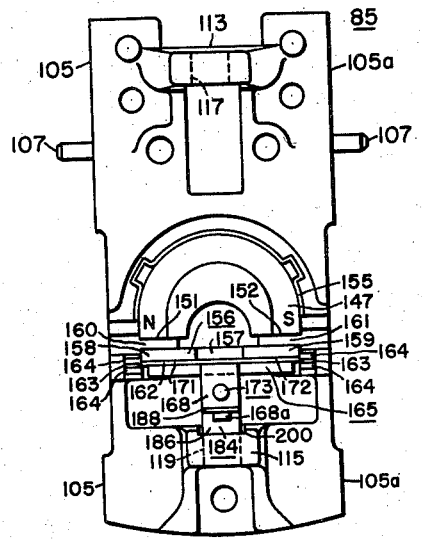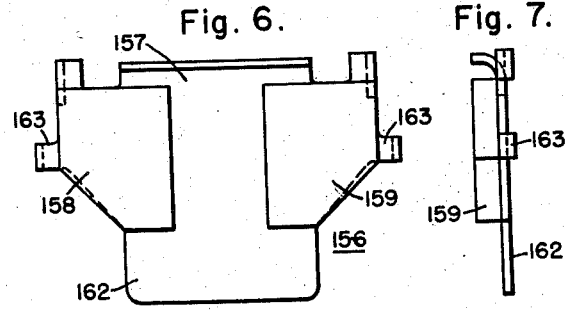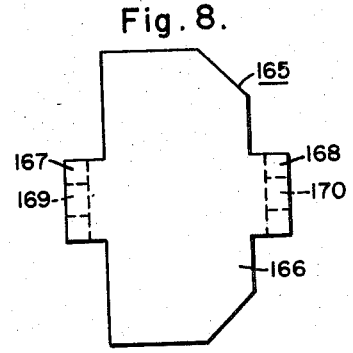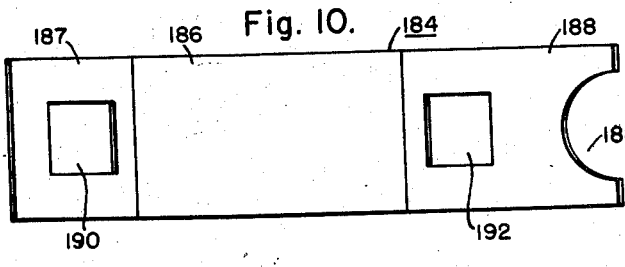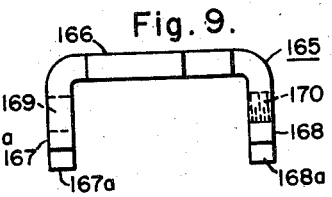

United States Patent Office 2,879,479
Patented Mar. 24, 1959

2,879,479

MAGNETIC DAMPING ASSEMBLY

Warren J. Schmidt, Bloomfield, and Walter Axman, Passaic Township, Morris County, N.J., assignors to Westinghouse Electric Corporation, East Pittsburgh, Pa., a corporation of Pennsylvania Application November 18, 1955, Serial No. 547,630

8 Claims. (Cl. 324—152)

This invention relates to a magnetic damping assembly and has particular relation to an adjustable damping assembly for watthour meters.

Watthour meters have previously been constructed which include an energizable stator structure having a magnetic structure with an air gap. An electroconductive armature ordinarily in the form of a disc is mounted for rotation through the air gap under the influence of a shifting magnetic field produced in the air gap by energization of the stator structure.

In order to damp rotation of the disc, watthour meters are ordinarily provided with a magnetic damping assembly. Damping assemblies have been provided which include a permanent magnet positioned relative to the disc, so that the disc intercepts flux from the magnet during rotation of the disc. Such action results in the establishment of eddy currents in the disc which produce flux which cooperates with flux of the magnet to retard rotation of the disc.

Permanent magnets for damping assemblies have previously been formed of both low and high coercive materials. Examples of low coercive materials are tungsten and chromium permanent magnet steels. Examples of high coercive materials which have been employed in magnets for damping assemblies are cobalt steel and an aluminum-nickel alloy known as Alnico.

In certain installations, it may be desirable to provide an adjustable damping assembly for permitting variation of the damping effect. Such adjustments have previously been accomplished in a variety of ways. According to one well-known construction, an adjustable magnetic shunt is provided for shunting a variable portion of magnetic flux emanating from the magnet away from the associated electroconductive disc. Such a shunt is satisfactory for low coercive magnet materials. However, it is difficult to obtain with a conventional shunt an adequate range of adjustment for high coercive magnet materials.

It should be noted further that it is undesirable to vary the flux distribution in permanent magnets formed of high coercive materials. Such a variation may occur in response to adjustments of a conventional magnetic shunt which shunts flux emanating from the magnet away from the associated disc. This variation in flux distribution may permanently affect the magnetization of the magnet involved.

In accordance with the present invention, a magnetic damping assembly of improved construction is provided which includes a permanent magnet with a magnetic armature spaced therefrom to define an air gap for receiving the associated disc. The armature is shunted by an adjustable magnetic member which is spaced from the armature. With such arrangement, adjustment of the magnetic member is effective to vary the amount of flux traversing the armature to thereby adjust the flux cutting the disc, but does not operate to divert flux produced by the magnet away from the disc.

In a preferred embodiment of the invention, a magnetic damping assembly is provided for a multielement watthour meter having a stator structure including a pair of electromagnetic elements operating upon a common electroconductive disc. The damping assembly includes a permanent magnet supported on one side of the disc by a frame member which assists in supporting the electromagnetic elements, such that flux of the magnet cuts the disc to provide a damping action. The magnetic armature is supported on the other side of the disc by a non-magnetic plate which is carried by the frame member. Such arrangement provides a compact structure and assures the maintenance of proper alignment between the armature and the magnet. The nonmagnetic plate further serves to effectively space the armature and the adjustable magnetic member.

The frame member preferably includes a pocket having an open end within which the several parts of the damping assembly are positioned. The adjustable magnetic member is conveniently mounted for adjustment towards and away from the open end of the pocket.

The invention further provides a damping assembly wherein the adjustable magnetic member is maintained in proper spaced relation with respect to the armature in any position of adjustment thereof. For this purpose, a resilient member is conveniently positioned to engage the frame member and the adjustable member to bias the adjustable member into engagement with the non-magnetic plate. The resilient member is arranged for adjustment with the adjustable member to maintain such biasing throughout the range of adjustment of the adjustable member.

The invention also provides a multielement meter with a common electroconductive disc including a disc-damping assembly which is adjustable from the front area of the meter when the meter is in an operative position. Adjustment of the damping assembly is conveniently effected by screw means positioned to engage the frame member and the magnetic member for rotation from the front area of the meter about an axis without substantial axial movement. Rotation of the screw means operates to adjust the magnetic member along such axis relative to the magnetic armature.

According to a further aspect of the invention, the damping assembly includes stop means adjustable with the magnetic member to engage the meter stator structure in advance of the limit of adjustment of the magnetic member to prevent accidental disengagement of the screw means and the magnetic member. The resilient biasing member is conveniently employed for this purpose.

It is, therefore, an object of the invention to provide a magnetic damping assembly of improved construction.

It is another object of the invention to provide a magnetic damping assembly including a permanent magnet with a magnetic armature spaced from the magnet supported by a non-magnetic plate in fixed relation with respect to the magnet.

It is a further object of the invention to provide a magnetic damping assembly including a permanent magnet and a non-magnetic plate supporting a magnetic armature in spaced relation with the magnet with a frame member mounting the magnet and plate in fixed relation.

It is still another object of the invention to provide a magnetic damping assembly including a permanent magnet and a magnetic armature spaced from the magnet with an adjustable magnetic member spaced from the armature by a non-magnetic plate which supports the armature.

It is a still further object of the invention to provide a magnetic damping assembly as defined in the preceding paragraph including a resilient member arranged for adjustment with the magnetic member to bias the magnetic member into engagement with the plate throughout the range of adjustment of the magnetic member.

It is another object of the invention to provide a watthour meter including two electromagnetic elements operating upon a common armature with an armature damping assembly adjustable from the front area of the instrument when the instrument is in an operative position.

It is a further object of the invention to provide a magnetic damping assembly including screw means engaging a magnetic member for rotation about an axis to adjust the magnetic member along such axis with means for preventing accidental disengagement of the screw means and the magnetic member at the limit of adjustment of the magnetic member.

Other objects of the invention will be apparent from the following description taken in conjunction with the accompanying drawings, in which:

Fig. 4 is a view in side elevation of the instrument of Fig. 1 with parts removed;

Fig. 5 is a view taken along the line V—V of Fig. 4 with parts removed;

Fig. 6 is a view in top elevation of a part of Fig. 4;

Fig. 7 is a view in side elevation of the part of Fig. 6;

Fig. 8 is a view in top elevation of another part of Fig. 4;

Fig. 9 is a view in side elevation of the part of Fig. 8; and

Fig. 10 is a view in top elevation of still another part of Fig. 4.

Figure 1:
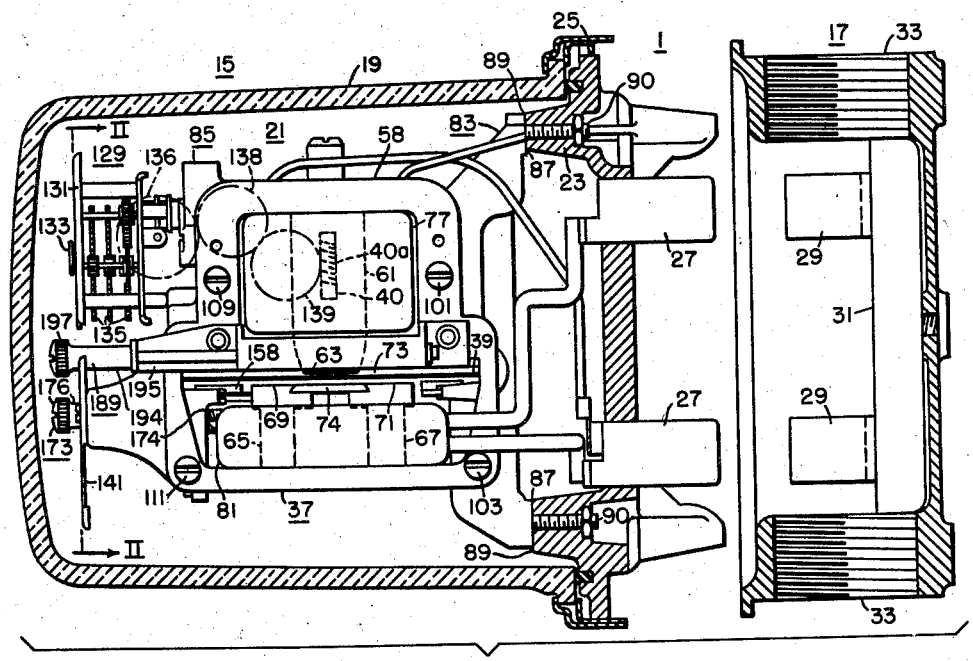
Figure 1 is a view in side elevation with parts shown in section of a watthour meter embodying the teachings of the invention.

Referring to the drawings, there is illustrated in Fig. 1 a multielement induction instrument represented generally by the numeral 1 embodying the teachings of the invention. For purposes of discussion, the instrument 1 is assumed to be in the form of a watthour meter for measuring the energy of a three-wire circuit (not shown). However, the instrument 1 may assume other forms, such as an induction relay device.

As illustrated in Fig. 1, the meter 1 is in the form of a detachable meter having a cover receptacle 15 adapted for detachable engagement with a suitable socket receptacle 17. The cover receptacle 15 includes a cover 19 preferably formed of a transparent material, such as glass, which is positioned to surround operating parts 21 of the meter secured to a suitable base plate 23. The cover 19 is secured to the base plate 23 by means of a rim structure 25. The base plate 23 is provided with a plurality of contact blades 27 to which certain of the parts 21 are electrically connected.

The socket receptacle 17 is provided with a plurality of contact jaws 29 which are mounted on an insulating support 31 of the receptacle 17. The receptacle 17 further includes a pair of opposed threaded openings 33 for receiving a suitably threaded conduit (not shown) which houses conductors of a circuit (not shown) which are electrically connected to the jaws 29. In order to condition the meter 1 for energization, the cover receptacle 15 is positioned relative to the socket receptacle 17 with the contact blades 27 in engagement with the jaws 29. In Fig. 1, the meter 1 is shown in a deenergized condition with the receptacles 15 and 17 detached relative to each other.

Figure 2:
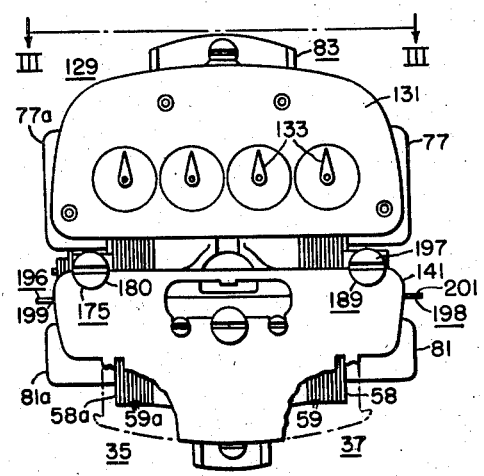
Fig. 2 is a view taken along the line II—II of Fig. 1 with parts removed.
Figure 3:
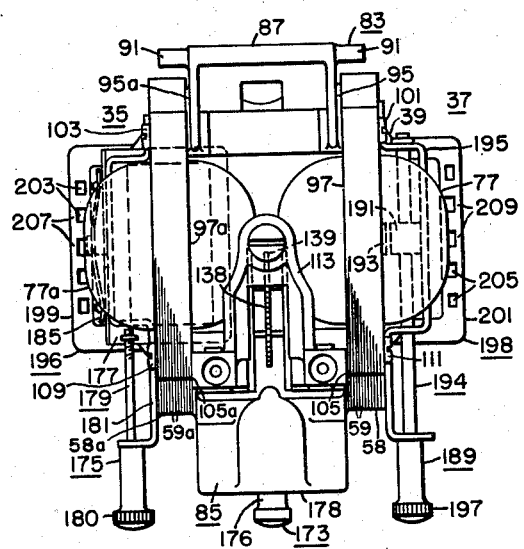
Fig. 3 is a view taken along the line III—III of Fig. 2 with parts removed.

As illustrated in Figs. 2 and 3, the meter 1 includes a pair of electromagnetic driving elements represented generally by the numerals 35 and 37. Each of the elements 35 and 37 is arranged to influence a suitable electroconductive armature illustrated in the form of a disc 39. The disc 39 may be constructed of any suitable electroconductive material, such as aluminum, and is mounted for rotation relative to the elements 35 and 37 about an axis by means of a shaft 40. The shaft 40 includes a threaded portion 40a adapted to engage a suitable gear forming part of a coupling means coupling the shaft to a suitable register referred to hereinafter. since the elements 35 and 37 are of identical construction, only the element 37 will be described.

As illustrated in Fig. 1, the element 37 includes a magnetic structure 58 preferably formed of a plurality of identical magnetic laminations 59 each having the configuration illustrated in Fig. 1. The laminations are preferably formed of a low-loss magnetic material, such as silicon steel. The structure 58 includes a voltage magnetic pole 61 having a pole face 63 and a pair of spaced current magnetic poles 65 and 67 having, respectively, pole faces 69 and 71. The pole faces 69 and 71 are located in a common plane which is spaced from and parallel to the plane defined by the pole face 63 to define an air gap 73. A suitable magnetic shunt 74 may be positioned between the current poles 65 and 67 to provide overload compensation as is understood in the art.

In order to permit energization of the structure 58, the element 37 further includes a suitable voltage winding 77 which surrounds the voltage pole 61. The winding 77 is preferably formed of a large number of turns of small cross-section conductor. The element 37 also includes a current winding 81 positioned to surround the current poles 65 and 67 to produce when energized magnetomotive forces for the poles 65 and 67 acting in opposing directions. The winding 81 is preferably formed of a relatively few number of turns of a large cross-section conductor as compared to the winding 77. In the drawings, similar components of the elements 35 and 37 are represented by the same reference numerals but with the suffix "a" added for components of the element 35.

In order to mount the operating parts 21 of the meter in operative positions, a suitable supporting frame assembly is provided. Details of the frame assembly are shown in Figs. 1, 3, 4 and 5. As there shown, the frame assembly is of two-part construction including a rear part 83 and a front part 85. The rear part 83 is adapted to mount the magnetic structures 58 and 58a in a pair of spaced parallel planes which include lines extending between front and rear areas of the meter when the meter is in an operative position as shown in Fig. 1. The part 83 is conveniently carried by the base plate 23 to support the structures 58 and 58a.

For this purpose, the part 83 includes spaced rear surfaces 87 adapted for engagement with cooperating surfaces 89 of the base plate 23. The frame part 83 is secured to the plate 23 by suitable securing means 90. Projections 91 having openings (not shown) extend from opposing side surfaces 95 and 95a of the part 83 for the purpose of receiving leads of the potential windings 77 and 77a to support such leads in proper positions.

In order to permit mounting of the structures 58 and 58a to the part 83, the part 83 and the structures 58 and 58a are positioned with the side surfaces 95 and 95a of the part 83 in engagement, respectively, with side surfaces 97 and 97a of the structures 58 and 58a. Suitable pins (not shown) project from the surfaces 95 and 95a to engage openings of the surfaces 97 and 97a. The structures 58 and 58a may be secured to the part 83 in any suitable manner, such as by suitable securing means 101 and 103 which extend through a pair of vertically spaced sets of aligned openings of the structures 58 and 58a and of the part 83 as viewed in Fig. 1. With such arrangement, the structures 58 and 58a are mounted in a pair of spaced parallel planes which are transverse to the plane of the base plate 23 with the air gaps of the structures 58 and 58a in alignment in a plane transverse to the planes of the structures. It is observed by inspection of Fig. 3 that the frame part 83 is positioned substantially within the space between the structures 58 and 58a at the rear area of the meter.

The frame part 85 is provided for the purposes of mounting other operating parts of the meter 1 in operative positions and to maintain the spacing between the structures 58 and 58a to provide a rigid structure. For these purposes, the frame part 85 is conveniently carried by the magnetic structures 58 and 58a at the front area of the meter, as viewed in Fig. 1. To this end, the part 85 includes opposing side surfaces 105 and 105a adapted for engagement with the side surfaces 97 and 97a of the structures 58 and 58a. Suitable pins 107 extend from the surfaces 105 and 105a to engage openings of the surfaces 97 and 97a. In order to secure the frame part 85 to the structures 58 and 58a, suitable securing means 109 and 111 may be passed through a pair of vertically spaced sets of aligned openings of the structures 58 and 58a and of the part 85 as viewed in Fig. 1. It is observed by inspection of Fig. 3 that the frame part 85 is secured to the structures 58 and 58a substantially within the space therebetween at points which are spaced from the points at which the frame part 83 is secured to the structures 58 and 58a.

In order to mount the shaft 40 and the disc 39 for rotation relative to the structures 58 and 58a, the frame part 85 is provided with a pair of spaced projections 113 and 115 which extend from a common surface of the part 85 substantially parallel to the side surfaces 105 and 105a. As viewed in Figs. 3 and 4, the projections 113 and 115 are spaced in the vertical direction to project from the rear of the part 85 toward the front of the part 83 when the parts 83 and 85 are in operative positions. The projections 113 and 115 have suitable openings 117 and 119 in vertical alignment, as viewed in Figs. 4 and 5.

Suitable upper and lower bearing assemblies 121 and 123 are supported respectively by the projections 113 and 115 to mount the shaft 40 for rotation about the vertical axis. The assemblies 121 and 123 include respectively support screws 125 and 127 positioned to extend through the openings 117 and 119. The projections 113 and 115 are proportioned to mount the disc 39 for rotation through the aligned air gaps 73 and 73a of the structures 58 and 58a.

The frame parts 83 and 85 may be constructed of any suitable material. Preferably, the parts 83 and 85 are constructed of a non-magnetic electroconductive die casting material, such as an aluminum die casting alloy, which may be cast to provide parts 83 and 85 of the desired configuration. Such die casting material being electroconductive offers shielding against external electromagnetic fields. Since the parts 83 and 85 may be cast separately from other parts of the meter 1, a material may be employed which has a substantial melting temperature, such as a temperature of the order of 500° C. or higher. The material of the parts 83 and 85 may thus be selected to provide certain desired properties, such as physical, electrical and chemical properties, without fear that the temperatures required will interfere with other operations or components of the meter 1. The melting temperature of a suitable aluminum base die casting material is approximately 600° C. Further details of the construction of the supporting frame assembly may be found in application Serial No. 517,513, filed June 23, 1955, by James M. Wallace and assigned to the assignee of the present invention.

In order to provide a visual indication of the amount of energy consumed by an associated load device (not shown) a suitable register assembly 129 is provided. The register assembly 129 includes a dial plate 131 over which a plurality of pointers 133 pass in response to actuation thereof by suitable gearing 135. The gearing 135 is actuated in turn from the shaft 40 by intermediate coupling gears 136, 138 and 139. A suitable information bearing plate 141 is conveniently carried by the frame part 85 beneath the plate 131 in vertical alignment therewith, as viewed in Fig. 1.

For the purpose of damping rotation of the disc 39, one or more magnetic damping assemblies may be positioned to influence the disc 39. Preferably, two damping assemblies are provided for positioning at diametrically opposed areas of the disc 39. Since the damping assemblies may be of identical construction, only one of the damping assemblies will be described in detail.

As illustrated in Figs. 4 and 5, there is provided a damping assembly represented generally by the numeral 143. The assembly 143 includes a permanent magnet 147 of substantially U-shaped configuration having a pair of magnetically opposed poles 151 and 152 with pole faces lying in a common plane. The magnet 147 may be constructed of any suitable magnetic material. Preferably, the magnet is constructed of a high coercive magnetic material, a number of which are commercially available. For example, high cobalt permanent magnet steel, such as one containing 36% by weight of cobalt, is available. Preferably, a high coercive material, such as an aluminum-nickel alloy known as Alnico, is employed for the magnet 147. Such high coercive alloys have good resistance to demagnetization.

In order to permit mounting of the magnet 147 in an operative position, the frame part 85 is provided with a pocket 155 having an open end opening toward the frame part 83 when the frame parts are in operative positions, as shown in Fig. 1. The pocket 155 is proportioned to receive the magnet 147 through the open end thereof to position the magnet in a plane transverse to the planes of the structures 58 and 58a with the pole faces of the poles 151 and 152 located on one side of the disc 39 in a plane transverse to the shaft 40. The magnet 147 may be secured within the pocket 155 in any suitable manner.

The magnet 147 is preferably secured to the frame part 85 in the manner described in application Serial No. 437,030, filed June 16, 1954 by F. W. Witte and assigned to the assignee of the present invention. According to such arrangement, the magnet 147 is proportioned for positioning within the pocket 155 with clearance between the peripheral surface of the magnet and the side wall of the pocket. Suitable securing means may then be positioned within the pocket 155 between the peripheral surface of the magnet and the side wall of the pocket to secure the magnet to the frame part 85 within the pocket. According to the above-referred-to application, the securing means is in the form of a hardenable fluid material which is introduced into the pocket subsequent to positioning of the magnet therein. With this construction, it is observed that the magnet 147 is effectively shielded against external magnetic fields by means of the frame parts 83 and 85 and the structures 58 and 58a.

In order to provide a path for magnetic flux of the magnet 147, a magnetic armature represented generally by the numeral 156 is positioned substantially within the pocket 155 beneath the magnet 147, as viewed in Figs. 4 and 5, in a plane parallel to the plane of the pole faces of the poles 151 and 152. As shown in Figs. 5 and 6, the armature 156 has a substantially nonmagnetic gap 157 spacing a pair of armature parts or pole pieces 158 and 159 formed of magnetically soft iron or steel. The pole pieces 158 and 159 may be spaced by any non-magnetic material, such as brass, to provide the gap 157. It will be assumed, however, that the gap 157 is an air gap. The pole piece 158 is spaced from the pole face of the pole 151 to define therewith an air gap 160. Similarly, the pole piece 159 is spaced from the pole face of the pole 152 to define an air gap 161.

Polarity markings for the north pole N and the south pole S of the magnet 147 are indicated in Fig. 5. With the polarities as indicated, magnetic flux from the north pole crosses the air gap 160 into the pole piece 158. The flux then crosses the gap 157 into the pole piece 159 and returns to the south pole of the magnet through the air gap 161.

According to the present invention, the damping assembly 143 includes a non-magnetic member in the form of a plate 162 for supporting the armature 156 in an operative position. The plate 162 may be formed of any suitable non-magnetic material, such as brass. The pole pieces 158 and 159 may be secured to the plate 162 in any desired manner, such as by a welding operation. Details of construction of the plate 162 are shown in Figs. 6 and 7.

The plate 162 is preferably carried by the frame part 85 substantially within the pocket 155 to mount the pole pieces 158 and 159 in an operative position. With this arrangement, the maintenance of proper alignment between the magnet 147 and the pole pieces 158 and 159 is assured. As shown in Figs. 4 and 5, the plate 162 is secured to the frame part 85 in a plane parallel to the plane of the pole faces of the poles 151 and 152 of the magnet 147 to mount the armature 156 intermediate the magnet and the plate with the air gaps 160 and 161 in alignment with the air gaps 73 and 73a of the structures 58 and 58a. With this arrangement, a portion of the disc 39 will traverse the air gaps 160 and 161 to intercept flux from the magnet 147.

The plate 162 may be secured to the frame part 85 in any suitable manner. Conveniently, the plate 162 is secured to the frame part 85 as by a staking operation. For this purpose, the plate 162 is provided with side extensions 163 which project beyond the pole pieces 158 and 159 to engage deformable lips 164 of the frame part 85.

As previously pointed out, it is desirable that damping assemblies be provided with suitable adjustments. Such an adjustment is provided for the assembly 143 by a magnetic member or shunt 165. The member 165 is formed of a material, such as magnetically soft iron or steel, having a lower reluctance to magnetic flux than that offered by the non-magnetic gap 157 of the armature 156.

As illustrated in Figs. 8 and 9, the member 165 includes a central portion 166 connecting a pair of spaced restricted terminal portions 167 and 168 which extend transverse to the central portion 166. The portions 167 and 168 include respectively openings 169 and 170 which are aligned along an axis extending parallel to the central portion 166. The portions 167 and 168 further include restricted extensions 167a and 168a projecting parallel to such portions.

The magnetic member 165 is position substantially within the pocket 155 beneath the armature 156 in spaced relation with the armature, as viewed in Figs. 4 and 5, with the central portion 166 in a plane parallel to the plane of the plate 162 to have the terminal portions 167 and 168 extend away from the armature 156 with the openings 169 and 170 aligned along an axis extending transverse to the plane of the magnet 147. The member 165 is preferably position with the central portion 166 in engagement with the plate 162 to define with the pole pieces 158 and 159 a pair of non-magnetic gaps 171 and 172. As shown in Fig. 5, the width dimensions of the armature 156 and the portion 166 are substantially equal. This arrangement provides a low reluctance path for flux of the magnet 147 through the pole peices 158 and 159 and the member 165 to assure an effective adjustment.

Adjustment of the magnetic member 165 is effected along an axis extending transverse to the plane of the magnet 147 relative to the armature 156 towards and away from the open end of the pocket 155. Such adjustment operates to vary the reluctance of the gaps 171 and 172 whereby a variable portion of flux from the magnet 147 is shunted away from the armature 156 to the portion 166 of the member 165 through the gaps 171 and 172. Adjustment of the member 165 is further effective to shunt a variable portion of magnetic flux away from the high reluctance gap 157 to the relatively low reluctance portion 166 of the magnetic member 165. The overall affect of this adjustment is to vary the magnitude of flux crossing the air gaps 160 and 161 without causing an undesirable alteration of the flux distribution in the magnet.

According to a further aspect of the invention, the damping assembly includes means actuable from the front area of the meter 1 when the meter is in an operative position for adjusting the magnetic member 165. For this purpose actuable means in the form of a screw member 173 is provided for adjusting the member 165. As shown in Fig. 4, the screw member 173 includes a threaded portion 174 terminating in an enlarged head portion 176.

In order to mount the screw member 173 for rotation about an axis without substantial axial movement, the frame part 85 is provided with a wall portion 178 having an opening 182 proportioned to receive the screw member. The opening 182 is positioned in alignment with the openings 169 and 170 of the member 165 along a line extending between front and rear areas of the meter 1 when the meter is in an operative position.

The screw member is positioned to extend through the openings 182, 169 and 170 with the head portion 176 in engagement with the wall portion 178. The opening 170 of the member 165 may be provided with threads to threadably engage the threaded portion 174 of the screw member. A coiled spring 183 is positioned to surround the screw member 173 for engagement with the wall portion 178 and the terminal portion 167 in a compressed condition to prevent back lash of the magnetic member 165 for assuring positive adjustment of the member 165. The spring 183 serves additionally to maintain the screw member 173 in an operative position by preventing movement of the screw member along its axis to the left as viewed in Fig. 4. With such arrangement, the screw member is rotatable about its axis from the front area of the meter to effect adjustment of the magnetic member 165 along such axis relative to the armature 156 for varying the damping effect of the magnet 147.

In order to maintain alignment between the armature 156 and the magnetic member 165 throughout the range of adjustment of the member 165 to assure accurate adjustments, the invention provides that the damping assembly includes resilient means arranged to bias the central portion 166 of the magnetic member 165 into engagement with the plate 162 throughout the range of adjustment of the member 165. For this purpose, resilient means in the form of a spring member 184 is positioned between the frame part 85 and the member 165 in a tensioned condition to effect such biasing.

The spring member 184 is of the configuration illustrated in Figs. 4 and 10. As there shown the spring member 184 is in the form of a strip constructed of a suitable material, such as bronze, with a bowed central part 186 connecting a pair of spaced terminal parts 187 and 188. The terminal parts 187 and 188 include respectively openings 190 and 192 with the terminal part 188 having additionally a curved recess 188a of the terminal edge, as best shown in Fig. 10.

In order to mount the spring member 184 for adjustment with the magnetic member 165, the projection 115 of the frame part 85 includes a table portion having a guide slot 200 which extends substantially parallel to the axis of rotation of the screw member 173. As shown in Fig. 4, the spring member 184 is positioned with the bowed part 186 within the slot 200 in engagement with the projection 115 to have the terminal parts 187 and 188 located such that the extensions 167a and 168a of the member 165 extend respectively through the openings 190 and 192 of the spring member 184. Such arrangement assures that the central portion 166 of the member 165 is biased into engagement with the plate 162 throughout the range of adjustment of the member 165.

It is observed that the member 165 and spring 184 form a compressible loop with the spring 184 constituting the compressible portion of the loop and the member 165 defining an incompressible portion of the loop. The screw member 173 is positioned to cross the loop along a line separating the compressible and incompressible loop portions. It is further noticed that a separate part of each loop portion engages a fixed part of the assembly. Such loop arrangement serves to provide a convenient bearing support for the end of the screw member opposite to the end thereof which engages the wall portion 178.

In order to assure against accidental disengagement of the screw member 173 and the magnetic member 165 at the limit of adjustment of the member 165, the invention provides that the damping assembly includes stop means arranged to prevent adjustment of the member 165 to the limit where the screw member is withdrawn from the opening 170 of the member 165. The stop means is preferably arranged for adjustment with the member 165 to engage the stator structure of the meter in advance of the limit of adjustment of the member 165. The spring member 184 is conveniently employed for this purpose.

By reason of the symmetrical arrangement of the frame part 85, the shaft 40 and the magnetic structures 58 and 58a, the axis of rotation of the screw member 173 extends transverse to the axis of rotation of the shaft 40 to intersect such axis of rotation. Consequently, the magnetic member 165 and the spring member 184 are adjustable towards and away from the axis of rotation of the shaft 40. As viewed in Fig. 4, the spring member 184 is proportioned and positioned such that the terminal part 188 of the spring member is located nearer to the axis of rotation of the shaft 40 than the member 165 and projects toward the support screw 127 of the lower bearing assembly 123.

With this arrangement, continued rotation of the screw member in a direction to adjust the magnetic member and the spring member to the right, as viewed in Fig. 4, will result in engagement of the recess 188a of the terminal part 188 with the support screw 127 in advance of the arrival of the terminal portion 168 of the member 165 at the end of the screw member. Consequently, accidental disengagement of the screw member and the adjustable magnetic member is effectively prevented at the limit of such adjustment.

It is observed that the frame part 85 together with the damping assembly may be detached as a unit from the structures 58 and 58a by releasing the securing means 109 and 111. Such detachment does not affect the adjustment of the damping assembly inasmuch as the relative positioning of the magnet 147, the armature 156 and the member 165 is not altered by such detachment. It has further been observed that delicate or fine adjustments are readily obtained by means of a damping assembly constructed in accordance with the invention.

In order to control the influence of the elements 35 and 37 upon the disc 39, suitable adjustments are provided. For this purpose, suitable light load adjusting means 175 is provided to control the response of the meter 1 to light load conditions of the circuit (not shown). The adjusting means 175 may be associated with one or both of the elements 35 and 37. Details of construction of the adjusting means 175 is illustrated in Fig. 3.

As there shown, the adjusting means 175 is associated only with the element 35 and includes an electroconductive member 177 positioned beneath the voltage pole of the structure 58a in the path of the voltage flux to intercept a portion of the voltage flux. The member 177 is shown in the form of a closed loop effective to lag a portion of the voltage flux to develop a torque which is applied to the disc 39. For the purpose of providing a variable torque, the member 177 is mounted for adjustment relative to the associated voltage pole to intercept a variable portion of the voltage flux. To this end, a suitable actuating mechanism is provided which is actuable to effect movement of the member 177 relative to the voltage pole along an axis extending parallel to the plane of the structure 58a.

The adjusting means 175 is adjustable from the front area of the meter 1 to effect movement of the member 177. The adjusting means 175 is also positioned at a side of the structure 58a which is opposite to the side thereof containing the shaft 40. For this purpose, the actuating mechanism includes a screw member 179 which is mounted in threaded engagement with a portion of the member 177 for rotation relative to the member 177 about an axis extending parallel to the plane of the structure 58a. The screw member 179 is mounted at a side of the structure 58a with an actuable end portion 180 thereof projecting beyond an end of the structure 58a. A suitable bracket 181 is secured to the structure 58a for supporting the screw member 179 for rotation. The bracket 181 carries a suitable spring member 185 which engages a portion of the member 177 to mount the member 177 to the bracket 181 for movement relative to the structure 58a. Further details of the construction of light load adjusting means may be found in application Serial No. 465,162, filed October 28, 1954 by F. V. Kadri and assigned to the assignee of the present invention.

In order to cause the elements 35 and 37 to apply substantially equal torques to the disc 39 for identical conditions of energization of the elements 35 and 37, suitable phase balance adjusting means is provided for adjusting the torque applied by one or both of the elements. As illustrated in Figs. 2 and 3, phase balance adjusting means 189 is associated with the structure 58 of the element 37 to control the torque applied by the element 37.

The adjusting means 189 includes a shunt magnetic path having an adjustable portion adjustable for diverting a variable portion of the voltage flux of the structure 58 away from the air gap 73 through the shunt path. To this end, a magnetic block 191 is mounted adjacent the air gap 73 for movement relative to the voltage pole 61 along an axis extending parallel to the plane of the structure 58 and to the plane of the pole face 63. A suitable magnetic projection 193 forming part of the shunt path may be secured to a side of the pole 61 to extend toward the block 191.

The adjusting means 189 is adjustable from the front area of the meter 1 when the structure 58 is in an operative position. The adjusting means 189 is further positioned at a side of the structure 58, which is opposite to the side thereof containing the shaft 40. To this end, a suitable non-magnetic screw member 194 is carried by a magnetic bracket 195 constituting the main portion of the shunt path in threaded engagement with the block 191 for rotation relative to the block 191. The member screw 194 is mounted at a side of the structure 58 for rotation about an axis extending parallel to the plane of the structure 58. The screw member 194 includes an actuable end portion 197 which projects beyond an end of the structure 58. Further details of the construction of phase balance adjusting means may be found in application Serial No. 517,595, filed June 23, 1955, by W. J. Schmidt and assigned to the assignee of the present invention.

When the structures 58 and 58a are energized, it is desirable that the voltage and current fluxes of each of the structures have a predetermined phase relationship. This relationship should be such that at unity power factor of the circuit (not shown), the voltage and current fluxes have a quadrature relationship. In order to establish such phase relationship, separate lag adjusting means is associated with each of the elements 35 and 37.

As illustrated in Figs. 2 and 3, the lag adjusting means 196 and 198 are associated respectively with the structures 58a and 58. The adjusting means 196 and 198 include, respectively, electroconductive members 199 and 201 in the form of closed loops, each positioned to link magnetic flux produced by a separate one of the associated magnetic structures. The members 199 and 201 are preferably positioned to surround respectively the current poles of the structures 58a and 58 to intercept the voltage flux of the associated voltage poles.

In order to permit adjustment of the adjusting means 196 and 198 to establish a desired phase relationship between the magnetic fluxes of the elements 35 and 37 at a predetermined power factor of the circuit (not shown), the members 199 and 201 are provided respectively with a plurality of spaced openings 203 and 205 which define weakened sections 207 and 209 of the members 199 and 201. By effecting severance of the sections 207 and 209, the electrical resistance of the members 199 and 201 may be varied to thereby adjust the lag effect thereof. Further details of the construction of flux lagging members may be found in application Serial No. 419,972, filed March 31, 1954 by A. J. Petzinger and assigned to the assignee of the present invention.

The adjusting means 196 and 198 are adjustable from sides of the magnetic structures which are opposite to sides thereof which contain the shaft 40. For this purpose, the members 199 and 201 are positioned in planes extending transverse to the planes of the magnetic structures with the severable portions 207 and 209 spaced from the magnetic structures at sides thereof for severance by cutting action along axes extending transverse to the planes of the structures toward the structures.

Although the invention has been described with reference to certain specific embodiments thereof, numerous modifications are possible, and it is desired to cover all modifications falling within the spirit and scope of the invention.

We claim as our invention:

1. In a magnetic damping assembly, a supporting frame member, a permanent magnet carried by said frame member in a first plane, said magnet having a pair of magnetically opposed poles with pole faces positioned in a common second plane, a non-magnetic plate of planar configuration carried by said frame member in a plane spaced from and parallel to said second plane, a magnetic armature secured to and supported by said plate intermediate said pole faces and said plate in a plane spaced from and parallel to said second plane, said armature having a substantially non-magnetic gap spacing a pair of armature parts, each of said armature parts being spaced from a separate one of said pole faces to define a pair of air gaps, a magnetic member positioned in engagement with said plate spaced from said armature by said plate, means actuable to adjust said magnetic member relative to said armature along a line extending transverse to said first plane to vary magnetic flux from said magnet traversing said air gaps, and resilient means positioned to engage said frame member and said magnetic member for biasing said magnetic member into engagement with said plate, said resilient means being adjustable with said magnetic member to maintain said biasing throughout the range of adjustment of said magnetic member.

2. In a magnetic damping assembly, a supporting frame member, a permanent magnet carried by said frame member in a first plane, said magnet having a pair of magnetically opposed poles with pole faces positioned in a common second plane, a non-magnetic plate of planar configuration carried by said frame member in a plane spaced from and parallel to said second plane, a magnetic armature secured to and supported by said plate intermediate said pole faces and said plate in a plane spaced from and parallel to said second plane, said armature having a substantially non-magnetic gap spacing a pair of armature parts, each of said armature parts being spaced from a separate one of said pole faces to define a pair of air gaps, an adjustable member including a central magnetic portion connecting a pair of spaced terminal projections extending transverse to said magnetic portion, each of said terminal projections having a separate first opening, said adjustable member being positioned with said magnetic portion in engagement with the plate spaced from said armature by said plate, and with said terminal projections extending away from said plate to have said first openings in alignment along a first axis extending transverse to said first plane, said frame member including a wall portion having a second opening in alignment with said first openings, and a screw member having a threaded portion terminating in an enlarged head portion, said screw member being mounted with said head portion in engagement with said wall portion to have said threaded portion extend through said first and second openings for rotation about said first axis to effect movement of said adjustable member relative to said armature along said first axis for varying magnetic flux from said magnet traversing said air gaps.

3. In a magnetic damping assembly, a supporting frame member, a permanent magnet carried by said frame member in a first plane, said magnet having a pair of magnetically opposed poles with pole faces positioned in a common second plane, a non-magnetic plate carried by said frame member in a plane spaced from and parallel to said second plane, a pair of magnetic pole pieces secured to said plate in spaced relation in a common third plane spaced from and parallel to said second plane to define with said pole faces a pair of air gaps, an adjustable member including a central magnetic portion connecting a pair of spaced terminal projections extending transverse to said magnetic portion, each of said terminal projections having a separate first opening, said adjustable member being positioned with said magnetic portion in engagement with the plate spaced from said pole pieces by said plate, and with said terminal projections extending away from said plate to have said first openings in alignment along a first axis extending transverse to said first plane, said frame member including a wall portion at one side of said first plane having a second opening in alignment with said first openings, and a table portion extending beyond the opposing side of said first plane having a guide slot extending parallel to said first axis, a spring member having a bowed central part connecting a pair of terminal parts, said spring member being positioned with said central part within said guide slot in engagement with said table portion to have a separate one of said terminal parts in engagement with each of the terminal projections for biasing said magnetic portion into engagement with said plate, and a screw member having a threaded portion terminating in an enlarged head portion, said screw member being positioned with said head portion in engagement with said wall portion to have said threaded portion extend through said first and second openings for rotation about said first axis to adjust said adjustable member together with said spring member relative to said pole pieces along said first axis for varying magnetic flux from said magnet traversing said air gaps.

4. In an induction instrument, a magnetic structure having a first air gap, winding means for the magnetic structure effective when energized for establishing a shifting magnetic field in the first air gap, a supporting frame member, spaced bearing means carried by said frame member, an electroconductive disc mounted by said bearing means for rotation about a first axis relative to said magnetic structure through the first air gap under influence of said shifting field, a permanent magnet having a pair of magnetically opposed poles with pole faces lying in a common first plane, said magnet being supported by said frame member in a second plane parallel to said first axis with said first plane on one side of said disc, a non-magnetic plate of planar configuration carried by said frame member on the other side of said disc in a plane parallel to said first plane, a magnetic armature secured to and supported by said plate in a plane spaced from and parallel to said first plane to define a second air gap in alignment with said first air gap to receive said disc, said armature comprising a pair of armature parts spaced by a non-magnetic gap, an adjustable magnetic member positioned in engagement with said plate spaced from said armature by said plate, screw means engaging said frame member and said adjustable member for rotation about a second axis extending transverse to said second plane to adjust said adjustable member along said second axis relative to said armature towards and away from said first axis, and a resilient member positioned to engage said frame member and said adjustable member for biasing said adjustable member into engagement with said plate, said resilient member being adjustable with said adjustable member to maintain said biasing, one of said resilient and adjustable members having projection means positioned to engage said bearing means in advance of the limit of adjustment of said adjustable member to prevent disengagement of said screw means and said adjustable member.

5. In a magnetic damping assembly, a supporting frame member, a permanent magnet carried by said frame member in a first plane, said magnet having a pair of magnetically opposed poles with pole faces positioned in a common second plane, a non-magnetic plate carried by said frame member in a plane spaced from and parallel to said second plane, a magnetic armature secured to said plate intermediate said pole faces and said plate in a plane spaced from and parallel to said second plane, said armature having a substantially non-magnetic gap spacing a pair of armature parts, each of said armature parts being spaced from a separate one of said pole faces to define a pair of air gaps, said frame member including a wall portion extending parallel to said first plane having a first opening, and a table portion extending parallel to said second plane, a compressible loop including a magnetic portion and a pair of spaced aligned second openings, said loop being positioned in a plane transverse to said second plane intermediate said plate and said table portion in a compressed condition with said magnetic portion engaging said plate to have said first and second openings in alignment along an axis, and a screw member having a threaded portion terminating in an enlarged head portion, said screw member being positioned with said head portion in engagement with said wall portion to have said threaded portion extend through said first and second openings for rotation about said axis to adjust said loop relative to said armature.

6. In a magnetic damping assembly, a supporting frame of integral construction, a permanent magnet carried by said frame in a first plane, said magnet having a pair of magnetically opposed poles with pole faces positioned in a common second plane, a non-magnetic plate of planar configuration carried by said frame in a third plane spaced from and parallel to said second plane, a magnetic armature secured to and supported solely by said plate intermediate said pole faces and said plate in a fourth plane spaced from and parallel to said second plane, said armature having a substantially non-magnetic gap spacing a pair of armature parts, each of said armature parts being spaced from a separate one of said pole faces to define a pair of air gaps, a magnetic member positioned in engagement with said plate spaced from said armature by said plate, and means adjustably mounted by said frame effective when adjusted to move said magnetic member relative to the armature along a line extending transverse to said first plane to vary magnetic flux from said magnet traversing said air gaps.

7. In a multielement induction instrument, a pair of electromagnetic elements, each of said elements including a magnetic structure having an air gap, and winding means for the magnetic structure, said winding means being effective when energized for establishing a shifting magnetic field in the air gap; said magnetic structures being positioned in a pair of spaced parallel first planes with said air gaps in alignment in a second plane transverse to the first planes, an electroconductive armature mounted for rotation about a first axis extending substantially transverse to the second plane relative to the magnetic structures through the aligned air gaps under the influence of the shifting fields, each of said first planes extending between front and rear areas of the instrument, a supporting frame member of integral construction secured to said magnetic structures substantially within the space therebetween, and a damping assembly for damping rotation of said armature, said assembly including a permanent magnet having a pair of magnetically opposed poles with pole faces positioned in a common plane, said frame member supporting said magnet at the front area of the instrument in a third plane transverse to said first planes with said pole faces on one side of the electroconductive armature in a plane transverse to said first axis, a non-magnetic plate carried by said frame member on the opposite side of said electroconductive armature in a plane parallel to the plane of said pole faces, a magnetic armature secured to and supported solely by said plate in a plane spaced from and parallel to the plane of said pole faces, said magnetic armature having a substantially non-magnetic gap spacing a pair of magnetic armature parts, each of said magnetic armature parts being spaced from a separate one of said pole faces to define a pair of second air gaps in alignment with said first air gaps for receiving said electroconductive armature, an adjustable magnetic member positioned in engagement with said plate spaced from said magnetic armature by said plate, and means carried by said frame member actuable by an operation performed at the front area of the meter to adjust said magnetic member relative to said magnetic armature along a line extending transverse to said third plane to vary magnetic flux from said magnet traversing said second air gaps, said frame member being detachably secured to said structures whereby the parts of the damping assembly including the magnet, non-magnetic plate, magnetic armature and magnetic member may be installed and removed with said frame relative to said structures as a unit without disturbing the relative positions of said parts.

8. In a magnetic damping assembly, a supporting frame member of integral construction having a pocket with a side wall terminating in an open pocket end, said side wall having a slot communicating with said open end to receive a portion of an electroconductive disc, a permanent magnet having a pair of magnetically opposed poles with pole faces positioned in a common first plane, said magnet being carried by said frame member within said pocket with said first plane positioned on one side of said slot parallel to said slot, a non-magnetic plate of planar configuration carried by said frame member substantially within said pocket in a second plane at the other side of the slot parallel to said slot, a magnetic armature secured to said plate within said pocket in a third plane at said other slot side parallel to said slot, said armature having a substantially non-magnetic gap spacing a pair of armature parts, said armature parts defining with said pole faces a pair of aligned air gaps aligned with said slot, a magnetic member spaced from said armature by said plate with the plate intermediate the armature and magnetic member, and means mounted by said frame member for adjustment to move said magnetic member along an axis extending parallel to said slot towards and away from said pocket open end.

References Cited in the file of this patent

UNITED STATES PATENTS

| | | |
|---|---|---|
| 2,209,969 | Green | Aug. 6, 1940 |
| 2,252,483 | Green | Aug. 12, 1941 |
| 2,352,965 | Mendelsohn | July 4, 1944 |
| 2,605,301 | Barnes | July 29, 1952 |
| 2,668,275 | Goss | Feb. 2, 1954 |